United States Patent [19]

Boettcher, Jr. et al.

[11] Patent Number: 4,520,437
[45] Date of Patent: May 28, 1985

[54] POWER CONVERSION CIRCUIT FOR SYNTHESIZING A SINEWAVE WITH PROGRAMMED AMPLITUDE CONTROL

[75] Inventors: Charles W. Boettcher, Jr., Chester; Billy H. Hamilton, Summit; William M. Slak, Convent Station; Walter L. Zweig, Rockaway, all of N.J.

[73] Assignee: AT&T Bell Laboratories, Murray Hill, N.J.

[21] Appl. No.: 513,691

[22] Filed: Jul. 14, 1983

[51] Int. Cl.³ .................. H02M 1/12; H02P 13/18
[52] U.S. Cl. ........................... 363/41; 363/56; 363/98
[58] Field of Search ............. 363/17, 41, 43, 56–58, 363/49, 97–98, 131–134; 323/901; 361/18, 87

[56] References Cited

U.S. PATENT DOCUMENTS

| | | | |
|---|---|---|---|
| 3,373,334 | 3/1968 | Geisz et al. | 363/26 |
| 3,376,490 | 4/1968 | Osugi | 363/41 |
| 3,614,590 | 10/1971 | Kernick | 363/43 X |
| 3,769,568 | 10/1973 | Hamilton et al. | 363/49 X |
| 4,410,935 | 10/1983 | Dang | 363/98 X |

OTHER PUBLICATIONS

"A Digital Signal Generator", *IEEE Micro*, vol. 1, Issue 4, Nov. 1981, T. S. Kinsel and J. H. Wuorinen, pp. 6–15.

Primary Examiner—Peter S. Wong
Attorney, Agent, or Firm—Alfred G. Steinmetz

[57] ABSTRACT

A waveform synthesizer is controlled in response to a stored program control utilizing tabular data stored in memory as the basis for generating timing signals to drive the power switching devices of the synthesizer. A plurality of tables of differing modulation indices define rated current output and a below rated current output. The table defines rated level output timing signals as both pulse width and frequency modulated to reduce harmonics. Various overload conditions result in selection of different modulation indices or a total current shutdown. A high peak current overload results in a halt in a progressive upward selection of modulation indices during start-up. A high average current overload results in a reduction in modulation indices until the overload has cleared. A low converter voltage signal caused by current limiting in the converter is detected and also used to reduce the modulation index so that less DC current is drawn from the converter and operation is maintained near the maximum average output power capability of the converter.

8 Claims, 12 Drawing Figures

MODULATION INDEX = 0.5

MODULATION INDEX = 0.9

START UP ROUTINE

VARIABLE CARRIER FREQUENCY ROUTINE

OVERCURRENT INTERRUPT ROUTINE

POWER CONVERSION CIRCUIT FOR SYNTHESIZING A SINEWAVE WITH PROGRAMMED AMPLITUDE CONTROL

TECHNICAL FIELD

This invention relates to a power converter circuit for converting DC voltage into an AC voltage signal having a sinusoidal waveform. It particularly relates to a power conversion circuit for synthesizing a low frequency sinewave using a high frequency pulse width and frequency modulated carrier.

BACKGROUND OF THE INVENTION

Static power converters utilizing wave synthesis techniques have proved advantageous in saving space and weight when low frequency signal waveforms are required. This is due in part to the savings in the size and weight of magnetic components permitted by the high frequency of the carrier signal. The typical waveform synthesizer pulse width modulates a high frequency switched waveform and filters the modulated pulses to obtain the synthesized waveform. The switched waveform may have two levels or states of magnitude (positive and negative) or it may have three levels (positive, negative and zero).

A common technique is to use a switched waveform whose frequency (or period) is constant and to modulate the percentage of the period spent at one level, such that the average value of the waveform during a particular period equals the value of the synthesized waveform (normally a sinewave) at that same point in time.

It has been found that the use of a constant carrier frequency for a two level switching waveform does not permit optimum suppression of low order harmonics of the synthesized waveform. The harmonic content of the pulse width modulated constant frequency carrier tends to be concentrated at the carrier frequency and at multiples thereof. Hence, filtering is much more difficult than if this harmonic content is spread over a range of frequencies.

SUMMARY OF THE INVENTION

A power conversion circuit, embodying the principles of the invention, includes a high frequency DC-to-DC converter to convert a DC input voltage to two higher DC voltages at opposite polarities that is regulated and isolated from the input. A waveform synthesizer comprising alternatively operated power switching devices generates a high frequency pulse width and frequency modulated square wave from which a subsequent low-pass filter derives the desired sinusoidal signal waveform.

The timing of the drive signals for the power switching devices is controlled by a microcomputer. The time intervals at successive positive and negative pulses generated by the synthesizer are selected so that the frequency of the carrier varies from a high frequency at zero crossings of the generated sinusoid to a lower frequency at the peak value of the generated sinusoid. The width of adjacent positive and negative pairs of pulses is controlled by the microcomputer so that to a first approximation the average amplitude of these two pulses equals the average value of the sine waveform being synthesized at that same point in time. The timing signals controlling the time intervals between successive positive and negative pulses are supplied by the microcomputer from data stored in memory. A plurality of sets of timing intervals are stored in memory; each set designated by a modulation index and corresponding to a different amplitude of the synthesized sinewave. A modulation index of 1.0 corresponds to maximum amplitude, while another modulation index of 0.1 corresponds to an amplitude level that is 10 percent of the maximum amplitude.

The storage in memory of a plurality of sets of timing signals or modulation indices enables the microcomputer to easily adjust an amplitude of the synthesized sinewave by merely substituting one group of timing signals or modulation index in place of another to drive the switching devices. The microcomputer's stored program control is operative to automatically shift from one index to the next higher index during start-up as a means of providing soft starts when the synthesizer is initially turned on, or when it automatically restarts after a shutdown. The stored program is also operative to change from one modulation index to another in sequence in response to an average current monitor to protect the power conversion circuit from overload conditions, and in response to a low DC voltage signal from the converter to maximize the power output from the power conversion circuit under overload conditions.

The waveform synthesizer described herein advantageously distributes the harmonic content of the switched waveform over a range of frequencies by modulating the frequency of the carrier as well as the pulse widths, and hence reduces distortion of the synthesized waveform and, in addition, significantly reduces the amplitude of current swing in the filter inductor without a severe efficiency penalty that would accompany a high frequency carrier, constant over the whole period. In addition, the power output of the synthesizer is optimized by reducing the modulation index to prevent the converter from reducing the overall output by continuing to reduce its DC output voltage.

BRIEF DESCRIPTION OF THE DRAWING

The invention may be readily understood by reference to the following description and the accompanying drawing, disclosing an illustrative embodiment employing the principles of the invention in which.

DETAILED DESCRIPTION

Figure 1:
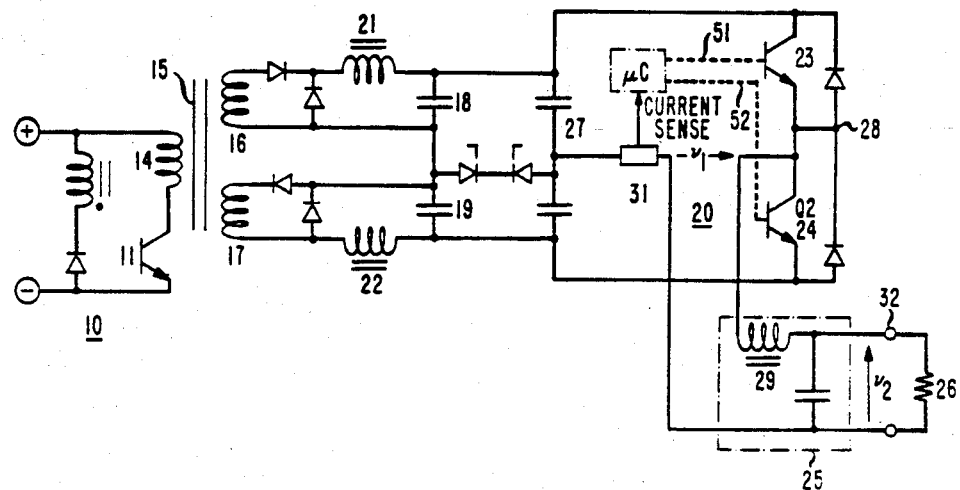
FIG. 1 is a schematic of a power converter circuit including a sinewave synthesizer embodying the principles of the invention.

A power conversion circuit including a high frequency DC-to-DC converter circuit or energizing unit 10 connected in cascade to a sinewave synthesizer 20 is discussed in FIG. 1. The converter unit 10 is energized by a DC voltage input which is coupled through a semiconductor power switch 11 to the primary winding 14 of a power transformer 15. The power transformer 15 includes two secondary windings 16 and 17 polarity-oriented so that the converter operates in a forward-type mode. Each secondary winding 16 and 17 is coupled to energize a voltage storage capacitor 18 and 19 through a filter inductor 21 and 22, respectively. The output storage capacitors 18 and 19 of each filter are connected in series, and are utilized as the DC voltage source for the waveform synthesizer 20.

The waveform synthesizer comprises two power semiconductor switches 23 and 24 connected in a bridge-like configuration with the two voltage storage capacitors 18 and 19. Output is delivered to a low-pass output filter 25 coupled to a load 26, the filter terminals being connected to opposite nodes 27 and 28 of the bridge. A microcomputer controller 30 is coupled to supply timing signals to drive the power switches 23 and 24. A current sensing circuit 31, connected to monitor the power return current, supplies feedback signals to the microcomputer for current-limiting purposes.

In operation, the initial converter circuit 10 converts an input DC voltage to a high level DC voltage which appears across the voltage storage capacitors 18 and 19, which, in turn, supply the DC voltage utilized by the waveform synthesizer 20. The waveform synthesizer alternately switches the two power switch transistors 23 and 24 to generate the modulated square wave voltage waveform across nodes 28 and 27 of the synthesizer, as shown by the pulse waveform 200 in FIG. 2. For a given period of the carrier the mean amplitude of the bi-valued waveform equals the amplitude of the sinewave to be synthesized at a corresponding point in its cycle. The duration of the various adjacent positive and negative pulses 201 and 202 is controlled by timing signals provided from data stored in the memory of the microcomputer drive circuit 30. The outputs of the microcomputer drive circuit are timing signals which control the alternate conduction intervals of transistor switches 23 and 24. Conduction of transistor switch 23 forces the switched waveform positive and conduction of transistor switch 24 forces it negative.

Figure 2:
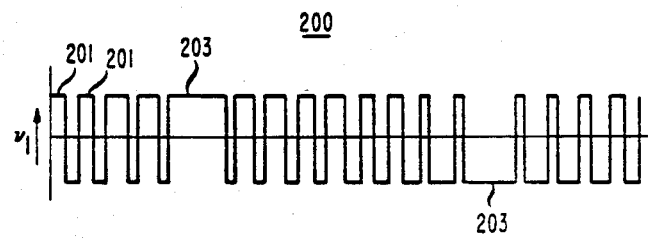
FIGS. 2 and 3 disclose voltage waveforms occurring in the circuit schematically disclosed in FIG. 1.
Figure 3:
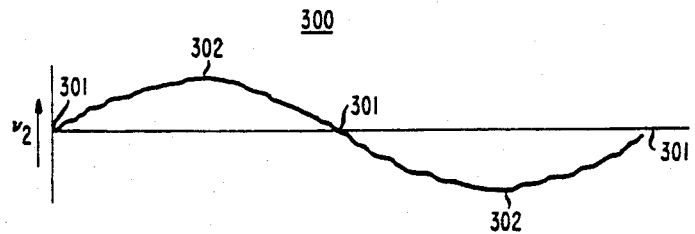

As is apparent from the waveform of FIG. 2, the switched waveform is both pulse width modulated and frequency modulated in response to the timing signals supplied by the microcomputer drive circuit 30. The carrier frequency is varied each half-cycle from some maximum value at the zero crossing 301 of the derived sinewave 300, as shown in FIG. 3, to a minimum value as the sinewave approaches its peak value 302. These modulation techniques advantageously minimize the low frequency harmonic content and reduce the amplitude of the harmonics in the vicinity of the carrier frequency by distributing them over a range of frequencies, rather than a single frequency and permit the use of smaller output filter components 29. The synthesizer waveform 300, as shown in FIG. 3, is approximately a sinusoidal waveform with the effects of distortion due to pulse filtering somewhat exaggerated therein.

Figure 4:
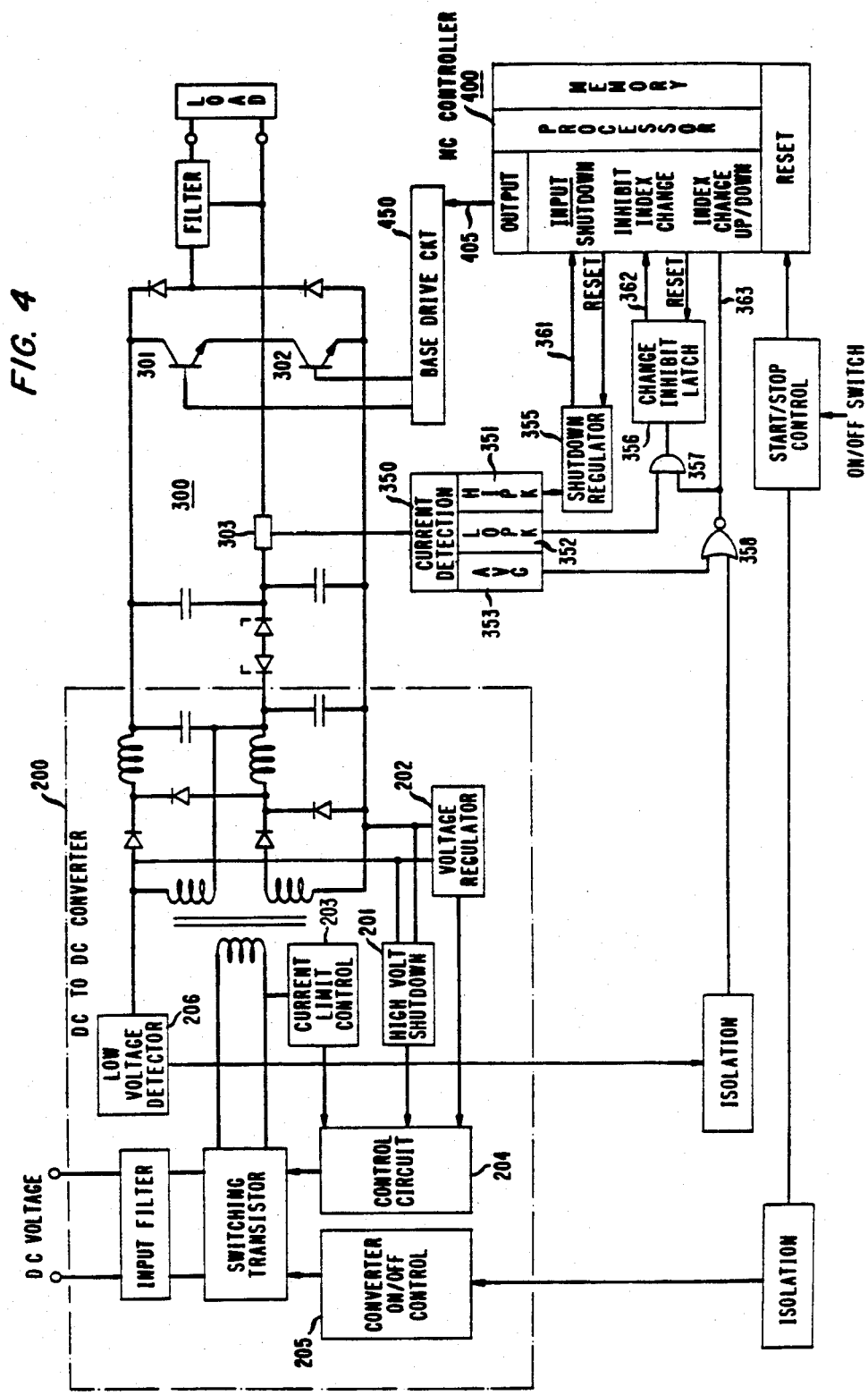
FIG. 4 is a more detailed block diagram and schematic of a power conversion circuit including a sinewave synthesizer embodying the principles of the invention.

A more complete schematic and block diagram of a power circuit using the principles of the invention is disclosed in FIG. 4. The waveform synthesizer of FIG. 4 discloses in more detail the current monitoring components which, in combination with the microcomputer controller 400 and its stored program control, enable the unique operative features of the synthesizer 300. The microcomputer controller 400 is operated to respond to several types of output current overload; to provide overcurrent protection for the synthesizer and to maximize the power output from the synthesizer 300 when the DC-to-DC converter 200 is operating in a current limit mode.

The DC-to-DC converter's generated voltage output is sensed by a high voltage shutdown circuit 201, a voltage regulator circuit 202, and a low voltage monitor 206 and its current output is sensed by a current limit controller 203. Control signals from these three circuits are coupled to a control circuit 204, which control the power switching devices of the DC-to-DC converter 200.

The current carried by the two switching devices of the synthesizer 301 and 302 is sensed by current shunt 303. The voltage of the current shunt 303 is coupled to a current detection circuit 350 which is operative to respond to three distinctly different current conditions, namely a high peak current condition in section 351, a low peak current condition in section 352, and a high average current condition in section 353. Since peak and average current detectors are well-known in the art, it is not believed necessary to discuss these particular detection circuits in detail. The high peak current condition sensed by unit 351 represents the maximum instantaneous current permitted in the semiconductor devices; and, hence, the current detector section 351 transmits detection of this current level to a shutdown latch circuit 355 which transmits an interrupt shutdown signal to the input 361 of the microcomputer controller, which, in turn, responds by generating a control signal to immediately shutdown both synthesizer switching transistors 301 and 302.

The low peak current level detected in section 352 is set lower in amplitude than the high peak current level. When this level is exceeded during the ramp-up interval, (or any time the modulation index is below unity), the output voltage is not permitted to increase in amplitude, in order to prevent a further increase in current and an unwanted shutdown. This allows the synthesizer to start into certain types of overload without shutting down. If the overload disappears within a few cycles, the ramping up of voltage will resume. If the overload persists, the slower average current monitor will assume control and act to limit the output current.

The high average current level to which detector section 353 responds is a current level amplitude selected to prevent overheating of the synthesizer circuit components. Occurrence of high average current overload results in a controlled reduction of the modulation index until the current drops below the high average current level, at which time, the modulation index is allowed to increase again. This current limiting feature permits the synthesizer to handle large sustained overloads such as large starting currents of induction motors, and to reduce those starting currents by reducing the applied voltage during the overload. Control of overload current in response to the high average current limit and the low peak current limit is accomplished, respectively, through gate 358 and through latch circuit 356 via AND gate 357. Both gate 358 and latch circuit 356 supply recognizable control signals to microcomputer controller 400 to permit proper response by the stored program control.

The control signal output of latch 356 on lead 362 is periodically poled by the controller and operates in a synchronous mode to inhibit or enable changes in the modulation index.

Latch 356 can only be set to inhibit changes in modulation index when the direction of change as controlled by gate 358 is in the "UP" or increasing direction. This is accomplished by AND gate 357.

The output of average current detector section 353 is coupled by a gate 358 to apply a control signal on lead 363, which causes the stored program control to change the modulation index of the carrier signal in either an up or down direction. In the case of a high average current overload, the direction of change is down; and, in its absence, the modulation index is permitted to increase.

A low voltage monitor circuit 206 is coupled to detect a low voltage at the output of the DC-to-DC converter. The low voltage monitor circuit supplies a control signal, via gate 358, to lead 363 which control signal is operative to decrease the modulation index of the synthesizer, when a drop in the converter's output voltage indicates that the converter is in a current limit mode of operation.

The current limit mode of operation reduces the converter output voltage in order to protect the converter from damage; this drop in voltage is utilized through the low voltage monitor circuit to reduce the modulation index of the synthesizer and reduce the synthesizer load on the converter. This feature prevents a drop in AC output power with an AC overload and instead, maintains power output at a constant value at approximately maximum output power, this guarantees maximum possible power output from the converter and therefor from the synthesizer 300 when the load on the synthesizer exceeds the power rating of the DC-to-DC converter.

The stored program in the microcomputer 400 responds to these control signals to change the modulation index of the timing signal to permit varying the amplitude of the output sinusoidal voltage in discrete steps to achieve the desired control of the current.

Figure 5:
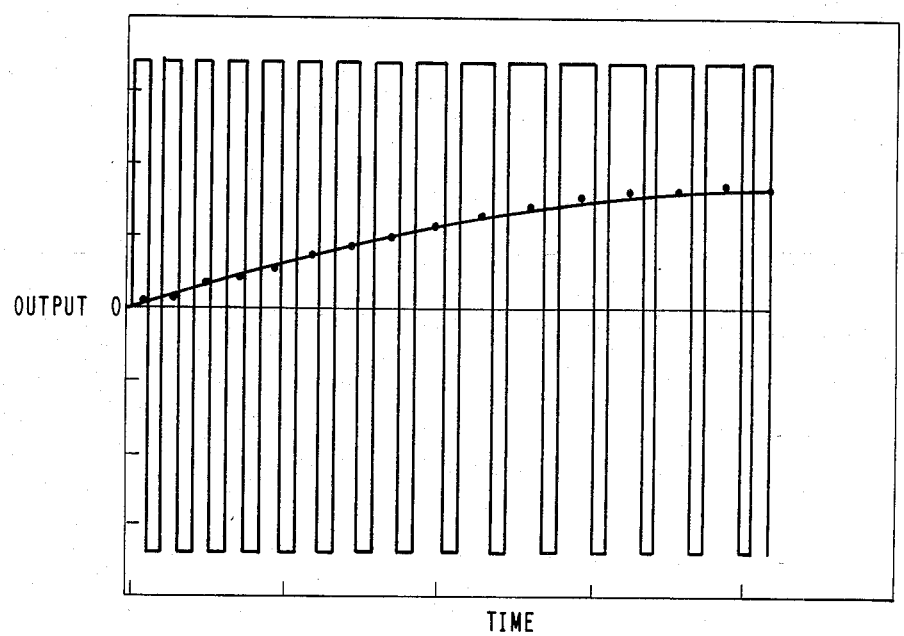
FIGS. 5, 6, and 7 are exemplary waveforms of carrier signals with different modulation indices.
Figure 6:
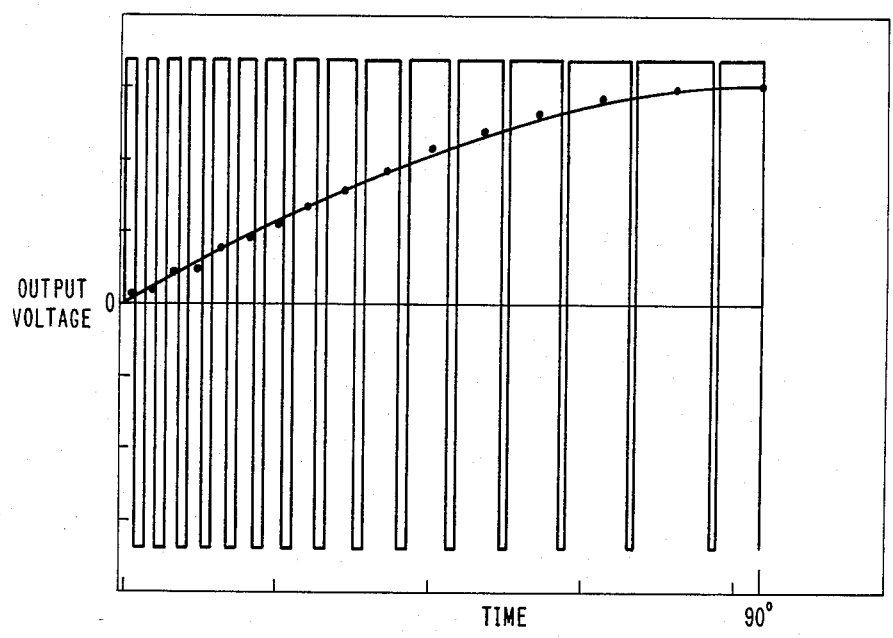
Figure 7:
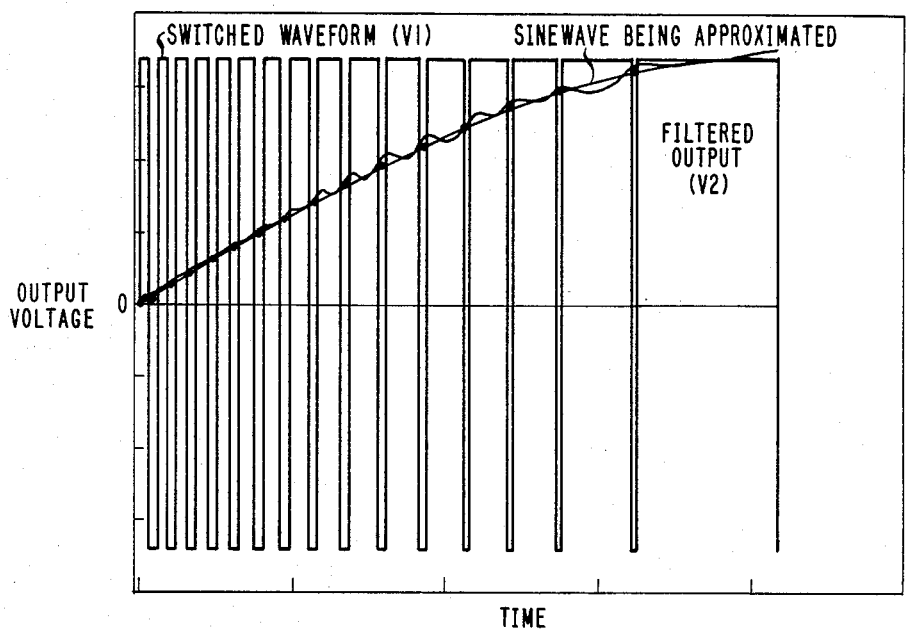

The modulated carrier pulse waveform of FIGS. 5, 6, and 7, is representative of the 50%, 90%, and 100% modulation indices, respectively. The summation value of adjacent positive and negative pulses represent the average value of the synthesized sinusoidal waveform at that particular location. The 100% modulation index in FIG. 7 represents the normal steady state operating condition. The modulation indices of 10% through 90% operate at a fixed frequency and, hence, are just pulse width modulated—not frequency modulated. The 100% modulation index is both frequency and pulse width modulated so as to minimize the total harmonic distortion at the steady state operating condition.

The stored program control in microcomputer 400 is operative during start-up to automatically step up from the lowest modulation index to the normal rated unity modulation index at definite time intervals to provide a soft start. The microcomputer starts with a zero modulation index and, after every three half-cycles of operation, advances to the next modulation index, which represents about a 10 percent increase in amplitude. This successive change of modulation indices continues until unity modulation index is reached, or an overload condition occurs which either halts the progressive increase of the modulation indices (LOPK) or operates to shut down the synthesizer (HIPK).

The feedback control responsive to synthesizer current and converter voltage described above is advantageously operative to both protect against most overload conditions and maximize power output from the overall inverter circuit. If a high peak current level is detected, the synthesizer devices are immediately turned off by a microcomputer signal, sent via lead 405 to the base drive circuit 450, and render both switches 301 and 302 nonconductive. After a short delay, the latch circuit 355 is reset by the stored program control; and the microcomputer attempts to restart the synthesizer in a soft start mode as described above. If the high peak overload condition has persisted, the latch circuit 355 cannot be reset and the synthesizer remains shut down.

If a low peak current is detected during the soft start process, the increase in the modulation index is halted; and the partial modulation index attained is continued for an undefined reasonable period of time when the low peak current level condition exists. If the low peak overload persists, one of the two slower control loops will take control. The modulation index of the synthesizer will be controlled by the low converter voltage monitor 206 or by the high average current monitor 353 depending on the power factor and the magnitude of the load and the power capacity of the DC-to-DC converter. The low peak current control advantageously responds quickly to limit the output current during the start-up period to allow time for slower control loops to take control. This feature allows the synthesizer to start and operate with heavy overloads without shutting down, since under ordinary shutdown control, a cyclic restarting of the soft start would provide insufficient current to permit motor starting.

The high average current control is utilized to prevent overheating of the synthesizer circuit components for low power factor loads. Once the high average current limit is reached, the stored program control of the microcomputer control operates to slowly reduce the modulation index by 10% steps to a sufficiently low level where the high average current limit threshold is not attained. During operation, the high average current limit control will cause the modulation index to alternate between levels to produce an average current output that vacillates around the high average current limit. This will continue until the overload is removed, whereupon the modulation index will slowly return to unity modulation index (100% level).

The operation of the stored program control may be readily ascertained by reference to the flow diagrams disclosed in FIGS. 8 through 12, which include a main routine, a start-up routine, a fixed carrier frequency routine, a variable carrier frequency routine, and an overcurrent interrupt routine.

Figure 8:
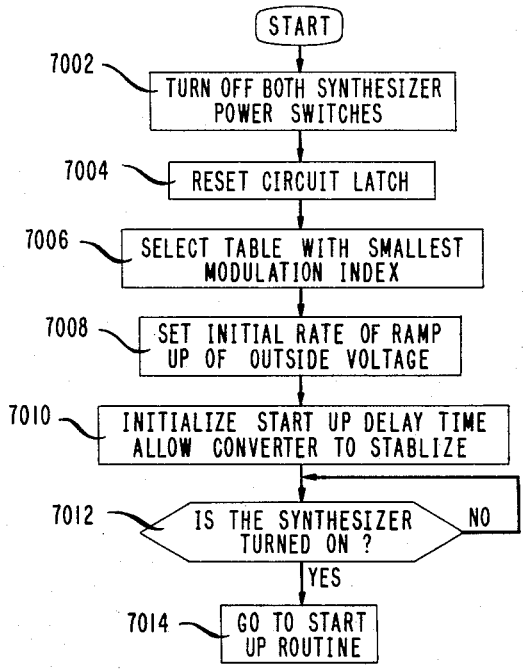
FIGS. 8 through 12 are flow diagrams for examining operation of the stored program control.

Operation begins with the main routine of FIG. 8, which initializes data and supplies constants to registers in the data storage or memory of the microcomputer. This routine runs continuously, irrespective of the on-off state of the synthesizer, so that the synthesizer is always ready for operation. The main routine of FIG. 8 begins by turning off both of the synthesizers' power switches (block 7002), and by resetting the latch circuits 355 and 356 of FIG. 4 so they are able to respond to defined overcurrent conditions (block 7004). Then, the correct modulation index table stored in memory, and from which the timing signals are derived, is selected for start-up purposes (block 7006). This will normally be the lowest modulation index at which a low output of the output sinusoidal waveform is generated to permit a soft start. The subsequent instruction (block 7008) sets the rate at which modulation index tables may be changed to control the soft start ramp up rate.

A start-up delay time is preset (block 7010) to prevent the synthesizer from starting and providing an output until the output of the DC-to-DC converter driving the synthesizer has stabilized. Since the main routine is operative, whether the synthesizer has been turned on or not, continuance through the main routine to the start-up routine is dependent upon determining whether the synthesizer has been turned on or not (block 7012). If the synthesizer is turned on, the stored program control continues to the start-up routine of FIG. 9 (block 7014). If it is not turned on, the control remains in the main routine, which continually recycles until the synthesizer is turned on.

Figure 9:
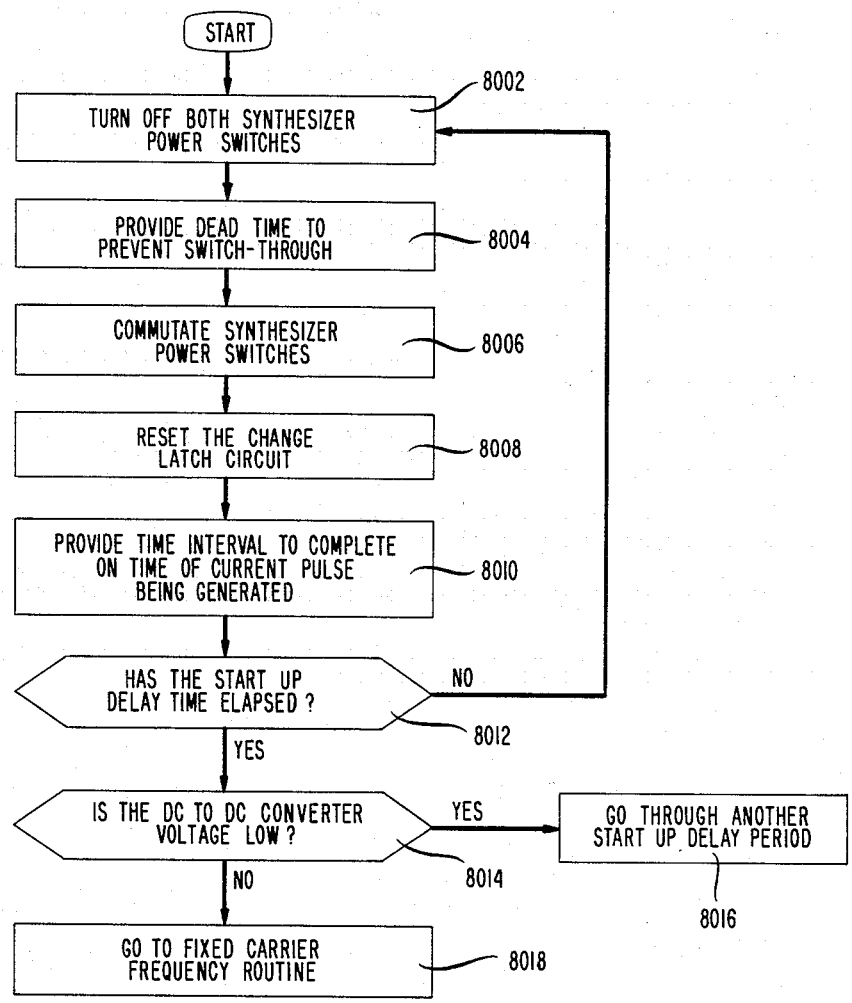
Figure 10:
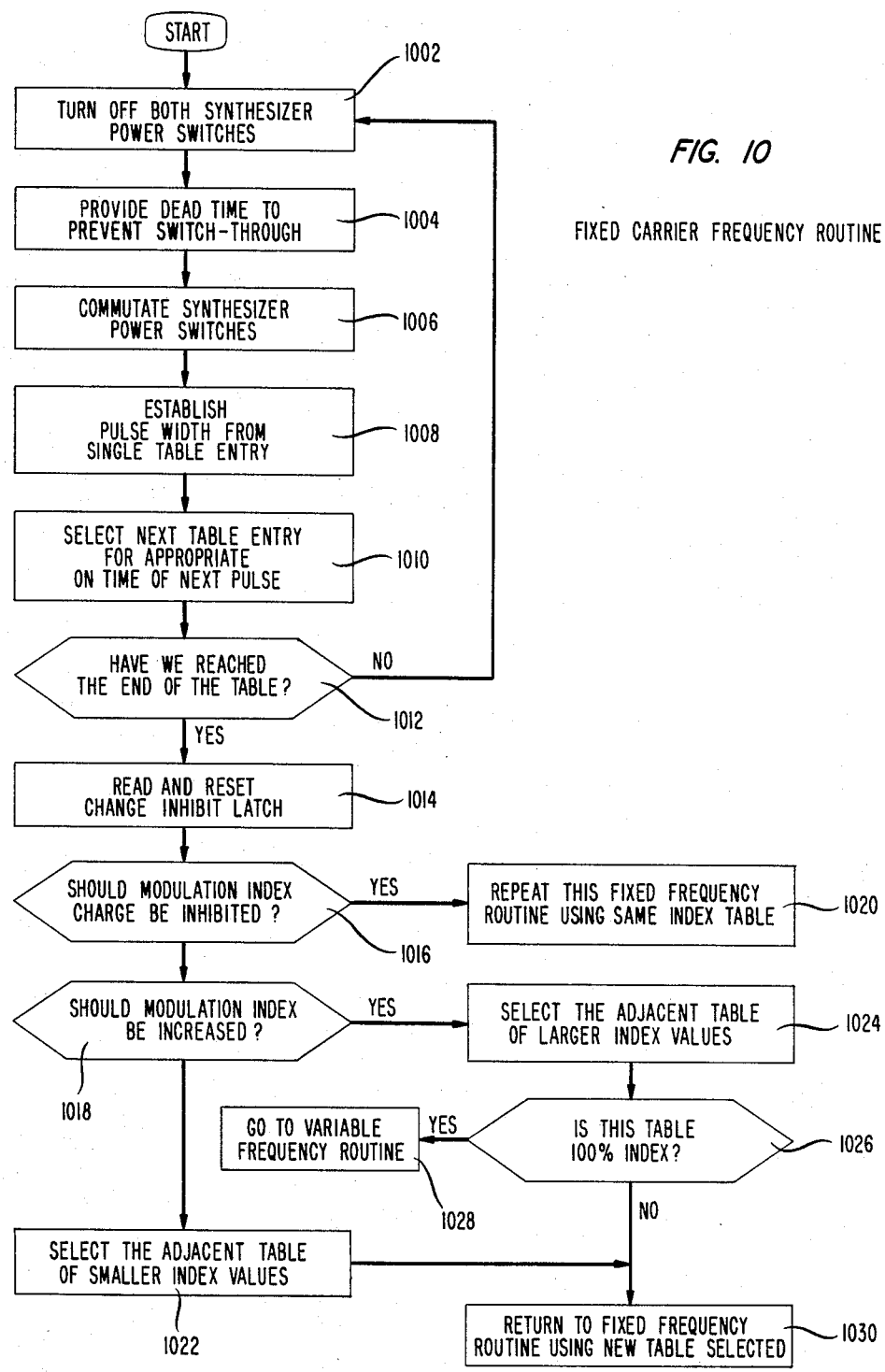

The start-up routine of FIG. 9 is invoked once the synthesizer is turned on, and is operative, to assure that a proper start-up delay passes before the synthesizer is turned on, so that the output of the driving DC-to-DC converter has stabilized at its proper value before the waveform synthesizer begins its operation. The routine begins by turning off both synthesizer power switches (block 8002). For the next and subsequent passes through the loop, this step turns off whichever power switch had been on. Then a dead time interval is developed to allow time for the power switch that had been on to actually turn off, before turning the opposite one on so that both synthesizer power switches are not turned on simultaneously, thereby causing a switch-through condition (block 8004). Then, one of the power switches is turned on (block 8006) while the other remains turned off. The change inhibit latch circuit (block 356 in FIG. 4) is again reset (block 8008) to assure its continued operation and ability to respond to control signals from signal sensors. A time interval is factored into the modulation index (block 8010) to permit computing of the proper duration of both the current and future pulse signals generated in response to timing signals derived from the modulation index table. If, at this point in time, the start-up time delay has not elapsed (block 8012), the initial block functions of the start-up routine are again repeated. If it has elapsed, and the low converter voltage signal circuit 205 in FIG. 4 has disappeared, the fixed frequency carrier routine of FIG. 10 is entered (block 8018). If the low converter voltage signal is still present, the start-up routine is repeated (block 8016).

The fixed carrier frequency routine shown in FIG. 10 is operative for synthesizing a sinusoidal waveform output at less than 100% of rated amplitude. It causes pulses to be generated with varying duty cycle, but at a fixed frequency with timing signals derived from the tabular values, representing different modulation indices from 10% to 90% of the rated output of the synthesizer. As in prior routines, the initial action is to turn off the synthesizer power switches, provide for the necessary dead time, and initially commutate the switches (blocks 1002, 1004, and 1006). Next, the width of the pulse width is computed and established, taking into account the modulation index table entry, the microprocessor execution time, and frequency of operation (block 1008). Following this, the individual table listings of values are taken sequentially to establish each subsequent pulse width generated by the synthesizer power switches (block 1010). Table values are selected in sequence until the end of the table has been reached (block 1012), at which point in time, the state of latch circuit 356 is read and recorded. Then, a pulse is generated to reset the latch circuit 356 so that it is placed in condition to properly respond to overcurrent control signals (block 1014). At this juncture, the stored program control examines the recorded state of the latch circuit 356 and polls the control signal on the lead 363 of FIG. 4 to determine if the modulation index should be maintained or increased or decreased. If a low peak current condition persists, the recorded state of the latch circuit 362 is such that the present modulation index must be retained; and the present fixed carrier frequency routine is repeated (blocks 1016 and 1020). However, if the modulation index may be changed, a decision responsive to a control signal on lead 363 must be made to either increase or decrease it (block 1018). If the synthesizer's current output signal is acceptable, the next larger modulation index table is selected (block 1024). If, however, a high average current condition has occurred, a smaller modulation index is selected (block 1022). If a larger modulation index value is indicated (block 1018 and 1024), the attainment of 100% modulation index with the next step indicates that the fixed frequency routine is terminated and replaced with the variable carrier frequency routine of FIG. 11. If the next step is less than 100%, the fixed carrier frequency routine is repeated with the next largest modulation index (block 1030).

Figure 11:
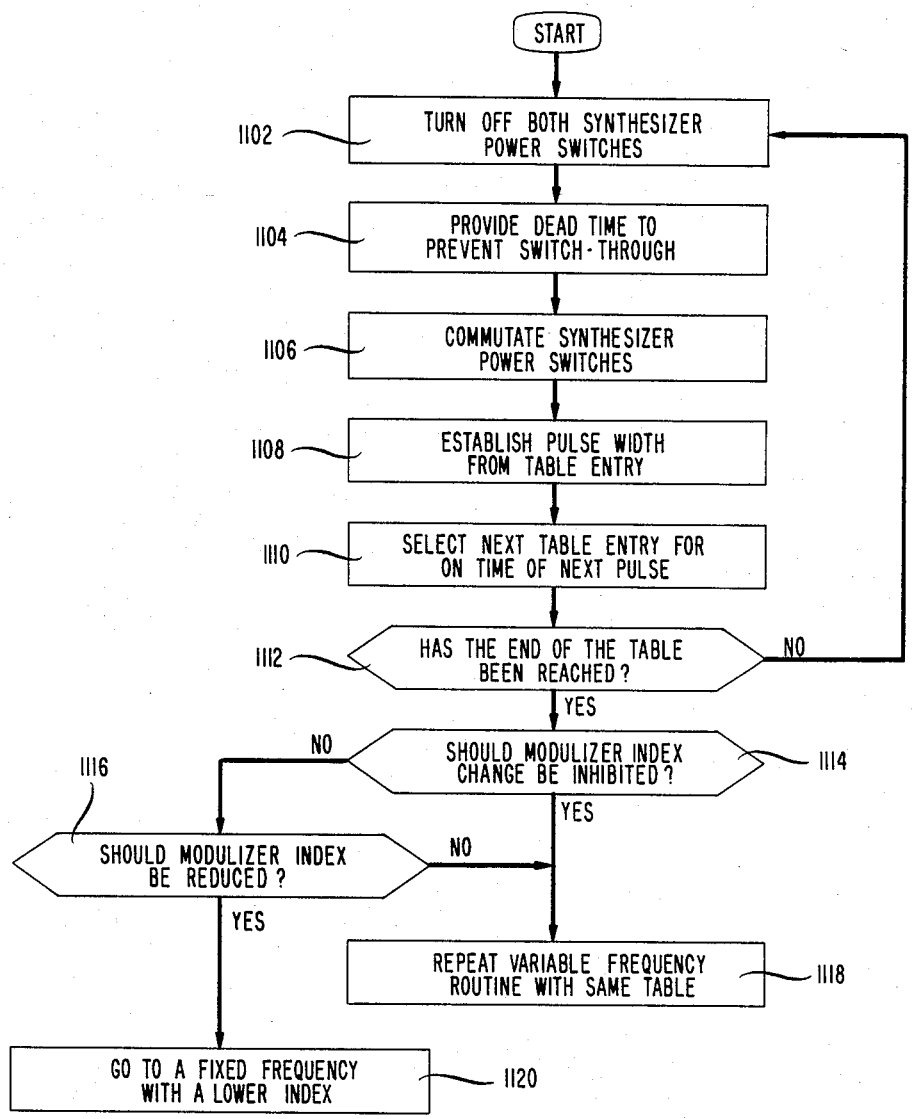

The variable carrier frequency routine of FIG. 11 is operative to control pulse widths of the synthesizer switches to produce a sinusoidal output of the synthesizer at 100% of the rated output signal amplitude. Modulation index values, prestored in the 100% table, are selected to produce concurrent frequency and pulse width modulation of the pulses generated by the synthesizer. In this mode of operation, the carrier frequency of the pulse signal is varied from a maximum value at the zero crossing point of the synthesized sinusoid to a minimum value as the sinewave approaches its peak value, to advantageously and significantly reduce harmonic distortion occurring at the output of the synthesizer output filter. A further advantage of this mode of operation is that peak-to-peak current fluctuations in the output current filter are significantly reduced and held at approximately a constant value over the entire cycle of operation.

Initially, both synthesizer switches are turned off, a dead time value is developed, and the switches are initially commutated (blocks 1102, 1104, and 1106). Then, the initial pulse width is established based on the initial table entry (block 1108). Consecutive table entries (block 1110) are addressed to generate the series of timing signals to frequency and pulse width modulate the pulse carrier train used by the synthesizer power switch. When the end of the modulation index table value is reached (block 1112), a determination is made as to whether the modulation index should be inhibited from changing (block 1114). Retaining the modulation index, for example, is made in response to the appropriate control signal on lead 362 (in FIG. 4), which is periodically poled by the stored program control. If the synthesizer is operating properly at rated value, then a change is not necessary; and the routine proceeds to repeat the variable frequency routine (block 1118). As long as the present index level is satisfactory, the routine is repeated using the same table value. If it must be reduced, a fixed frequency carrier routine with a lower index value is selected. The call for such a change is due to the control signal on lead 363 of FIG. 4. In response to the appropriate control signal calling for a reduction in index value, the synthesizer is operated with a fixed frequency routine with a lowered modulation index (block 1116 and 1120).

Figure 12:
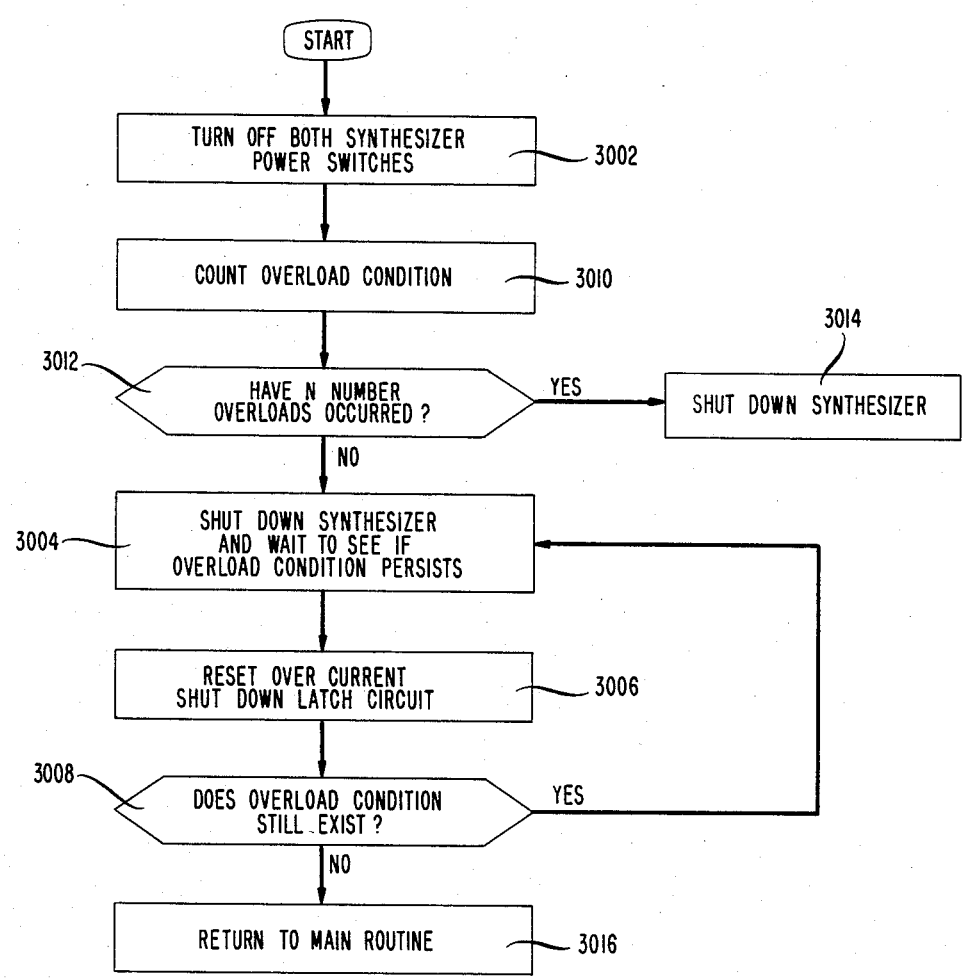

An overcurrent condition, in which the high peak current threshold is exceeded, is operated through the latch circuit 355 in FIG. 4 to generate an interrupt signal which calls the overcurrent interrupt routine of FIG. 12. Both synthesizer power switches are turned off (block 3002) upon detection of a high peak current overload, and a waiting period is established to determine if the overload will persist (block 3004). After the waiting period, the overcurrent shutdown latch current 355 in FIG. 4 is reset; and it is determined if the overload still exists (block 3008). If not, the routine is terminated, and control is given to the main routine (block 3016). A count is established to determine each time the overload condition is determined (block 3010); and, if the fixed number of N consecutive overload conditions occur before the synthesizer reaches maximum output (block 3012), a shutdown control signal is generated to positively shut down the synthesizer (block 3014).

What is claimed is:

1. A power conversion circuit for synthesizing a low frequency sinewave signal;
   input means for accepting a source of energy,
   means for converting the energy at the input means into a pulse carrier signal,
   means for modulating the pulse carrier signal by supplying timing signals to the means for converting, comprising:
   means for generating timing signals, including: a data processor under stored program control, a memory including a stored program for controlling the processor and a plurality of tables including timing signal data, each table being responsible for producing a different output sinewave signal amplitude, whereby the stored program selects one of the plurality of tables and utilizes its timing signal data for generating timing signals operative for modulating the pulse carrier
   output means for coupling to a load and including filtering means,
   means for detecting an average current overload condition,
   means for limiting average current output responsive to the means for detecting including:
   instructions in the stored program for selecting a different one of the plurality of tables of timing signal data for reducing an amplitude of the output sinewave signal and continuing to select different ones of the plurality of tables to successively reduce amplitude of the output sinewave signal until the average current overload condition is corrected.

2. A power conversion circuit as defined in claim 1 wherein the means for detecting further includes low peak current detection means and the stored program control being operative for disabling a selection of progressive tabular values said remaining fixed at a present tabulated index value at which a low peak current is detected.

3. A power conversion circuit as defined in claim 2 wherein a low voltage detector is coupled to detect a drop in voltage at the source of energy coupled to the input means,
   means, responsive to the low voltage detector for gating a signal to the means for modulating the pulse carrier signal, which signal is operative for changing the table used to generate timing signals.

4. A circuit for synthesizing a sinewave signal comprising:
   means for generating a pulse carrier signal including:
   a processor under control of a stored program,
   a memory including the stored program and a plurality of table of modulation index values,
   means for monitoring output signal conditions
   means for activating the stored program to select one of the tables of modulation index values in order to control a magnitude of an output signal in response to a signal from the means for monitoring,
   the processor and stored program utilizing a selected table of modulating index values to generate timing signals,
   at least one of the tables of modulation index values having values to permit generation of timing pulses that simultaneously pulse width modulate and frequency modulate the pulse carrier signal whereby
   the pulse carrier is pulse width modulated so that a net area value of pulses for a particular time interval substantially equals an amplitude value of a sinewave signal to be synthesized at a particular time interval, and
   is frequency modulated so that the pulse carrier signal continuously changes in frequency from a high limit frequency at points in time when the sinewave signal crosses its zero axis to a low limit frequency at a peak value of an amplitude of the sinewave signal, and
   means for deriving a smooth synthesized sinewave signal from the pulse carrier signal as so modulated.

5. A circuit for synthesizing a sinewave signal as defined in claim 4 where the plurality of tables of modulation index values define a plurality of waveforms having a series of amplitudes below and at a rated value, and the stored program includes instructions for selecting a progression of tabulated index values during start-up of the circuit.

6. A circuit for synthesizing a sinewave signal as defined in claim 5 further including means for detecting an overload condition having a high peak threshold, a peak threshold less than the surge threshold, and a continuous average overcurrent condition, the stored program controller responsive to the means for detecting and operative to shut down the means for generating when a high peak threshold is attained, prevent continued progressive selection of a succession of modulation index tables at start-up if a low peak threshold is attained, and to selectively reduce a level of modulation index tables until an average overcurrent condition is corrected.

7. A circuit for synthesizing a sinewave signal as defined in claim 5 wherein the stored program selects a progressive set of modulation index tables at start-up so that the synthesized sinewave slowly increases in amplitude.

8. A circuit for synthesizing a sinewave signal as defined in claim 7 wherein the stored program monitors a source of enabling energy applied to the means for generating a pulse carrier signal and prevents it from starting until the source of enabling energy is deemed stabilized.

* * * * *